United States Patent [19]

Kump et al.

[11] Patent Number: 5,660,946

[45] Date of Patent: Aug. 26, 1997

[54] SEALED LEAD-ACID CELLS AND BATTERIES HAVING AN EXPANDABLE COVER

[75] Inventors: William H. Kump, West St. Paul; Deborah Huke, Prior Lake, both of Minn.; Edward Mattan, St. Charles, Ill.

[73] Assignee: GNB Technologies, Inc., Mendota Heights, Minn.

[21] Appl. No.: 674,420

[22] Filed: Jul. 2, 1996

[51] Int. Cl.⁶ .................................................. H01M 02/04
[52] U.S. Cl. ........................ 429/180; 429/178; 429/181; 429/89; 429/66
[58] Field of Search ....................... 429/178, 184, 429/180, 181, 89, 66, 121, 183

[56] References Cited

U.S. PATENT DOCUMENTS

| | | | |
|---|---|---|---|
| 1,015,735 | 1/1912 | Heuser | 429/176 |
| 4,224,388 | 9/1980 | Stadnick | 429/181 |
| 4,317,870 | 3/1982 | Oellerich | 429/178 |
| 4,898,795 | 2/1990 | Stocchiero | 429/66 |
| 5,053,296 | 10/1991 | Stocchiero | 429/180 |
| 5,209,991 | 5/1993 | Stocchiero | 429/66 |

*Primary Examiner*—Prince Willis, Jr.
*Assistant Examiner*—Carol Chaney
*Attorney, Agent, or Firm*—Leydig, Voit & Mayer, Ltd.

[57] ABSTRACT

Sealed lead-acid cells and batteries include an expandable cover capable of accommodating the grid growth which occurs in service, the expandable cover comprises a first region which expands outwardly toward a second region and a flange which defines the terminal opening, and the cells or batteries include a terminal cover sealing assembly comprising inner-and outer-cell sealing members which together form an annulus in which the flange is seated and retain one or both include resilient seals such as an O-ring that provide a terminal-cover seal.

9 Claims, 3 Drawing Sheets

SEALED LEAD-ACID CELLS AND BATTERIES HAVING AN EXPANDABLE COVER

FIELD OF THE INVENTION

The present invention relates to lead-acid cells and batteries, and more particularly to such cells and batteries having an expandable cover capable of accommodating the grid growth which occurs in service.

BACKGROUND OF THE INVENTION

Sealed lead-acid cells and batteries, for many application, have significant advantages in comparison to the use of conventional, flooded lead-acid cells and batteries. Such cells and batteries, sometimes termed "VRLA" cells and batteries (i.e., valve-regulated, lead-acid), utilize bunsen valves and the like to maintain the desired internal pressure for an efficient oxygen recombination cycle.

Some applications where such sealed cells and batteries are used are termed stationary battery applications. In such applications, such cells and batteries are maintained at a full state-of-charge and in a ready-to-use condition, typically by floating at a constant preset voltage. Stationary cells and battery applications include use for stand-by or operational power, including telecommunications, utilities, emergency lighting for commercial buildings, stand-by power for cable television systems, and uninterruptible power supplies.

Such uninterruptible power supplies concern, for example, systems which back-up computers and communication networks. Having a reliable uninterruptible power source accommodates the orderly shutdown of computers when there is a sudden interruption in the primary power source, typically during an electrical power outage. Such an uninterruptible power source will also accommodate short, or intermittent, losses in power. In the event of a power interruption, the uninterruptible power source is subject to a rapid, and sometimes deep, discharge.

Another potential application for sealed lead-acid cells and batteries is a variety of motive power applications in which an array of cells or batteries provides the motive power for vehicles ranging from Class 1 to Class 3 trucks, various automated guided vehicles, mining vehicles and also railroad locomotives. The performance requirements for motive-powered vehicles are quite different from the performance requirements for stationary battery power sources. In stationary applications, the depth of discharge in service is relatively shallow, and the number of discharges is small, as most batteries are in float service. In direct contrast, motive power applications require relatively deep depths of discharge to be achieved on a continuous cycling basis over a period of time. Indeed, a common requirement for Class 1-3 trucks is that, in an 8-hour shift, the cell or battery assembly must be capable of delivering an 80% depth of discharge and that performance is required for about 300 cycles per year with a useful service life under those conditions of 4 or 5 years.

A common problem encountered by such VRLA cells and batteries is the integrity of the terminal seal over time as a result of grid growth which occurs in service. As has been especially common at the positive terminal, grid growth occurs as a battery grid corrodes over time, hence causing the battery terminal to move outwardly relative to the battery cover. This relative rise causes stress on both the required terminal-cover seal, as well as the requisite container-cover seal. As the container and cover are commonly made of plastic, each was known to fail in various ways, such as by fracturing, cracking at welds, and so forth. Failures such as these have resulted in the leakage of electrolyte from the cells and batteries and has also resulted in failure to operate properly. This well-known problem is particularly acute in sealed lead-acid cells and batteries because relatively high internal temperatures in service can be reached. Such relatively high temperatures lead to an increase in the rate of grid corrosion which can result in significant grid growth.

This problem is not only well-known, but has also commanded substantial attention. A wide variety of attempted solutions have been proposed.

U.K. Patent 2026761A thus describes an assembly for securing a terminal post in a cover of an accumulator. The terminal post has a shank with circumferential ribs onto which a collar member is molded. The member has an upwardly-extending, annular neck by which the member is welded to a corresponding neck of the cover. The welded neck of the cell cover is joined to the cover by a flexible annular part made of a thin thermoplastic material in corrugated form.

Another attempt to solve the problems caused by terminal expansion is illustrated in U.S. Pat. No. 4,445,356 to Barrette, Jr. The '356 patent depicts a battery having a plastic bellows integrally molded or heat or sonically sealed to a battery cover at one end and either molded, heat or sonically sealed to a lead terminal extension or a plastic terminal sleeve at another end, wherein the plastic bellows is raised above the level of the battery cover and the terminal post passes through the plastic bellows.

Still another attempt to solve the terminal expansion problem is shown by U.S. Pat. No. 4,467,021 to Stocchiero. This patent utilizes a flexible, concave battery lid for distributing stress due to elongation of terminal poles, and the poles are shown welded to a bushing. As noted in his later patent, U.S. Pat. No. 4,898,795, Stocchiero indicates that the lid in his '021 configuration presents limited elasticity where its width is considerably reduced in relation to its length.

Yet another attempt to solve the problems caused by terminal expansion is disclosed in the aforementioned '795 patent. The '795 patent depicts an elastic diaphragm co-axially aligned with an accumulator pole below the surface of the lid. The elastic diaphragm is shown as having either a corrugated, bellows-shaped tube or toroidal shape. In one embodiment, a threaded bushing receives a threaded pole. In this same embodiment, the diaphragm is integrally attached to the lid at one edge, and as the bushing is tightened around the pole, the other edge of the diaphragm is locked between the threaded bushing and an O-ring, which O-ring is positioned between the threaded bushing and the pole. As opposed to the proposed solutions previously described wherein diaphragms were designed to operate by flexible expansion, the diaphragm in the '795 patent is intended to operate by collapsing.

Despite all of the prior efforts in this area, there still exists the need for a cover-seal configuration which can adequately accommodate the inevitable grid growth in use, but which also can be readily manufactured. A satisfactory configuration thus must be capable of being efficiently made while achieving the reliable and requisite seals.

Accordingly, it is a primary object of the present invention to provide sealed lead-acid cells and batteries whose integrity is not compromised in service as the inevitable grid growth takes place.

Another object of this invention is to provide a flexible, yet durable, cell or battery cover which is responsive to terminal post expansion so that, as grid growth occurs, the cover responsively expands, maintaining its integrity, and that of the terminal post-cover seal.

A still further object of the present invention is to provide a method of manufacturing a cell or battery cover which is both efficient and also results in a reliable configuration.

Other objects and advantages of the present invention will be apparent as the following description proceeds, taken with the accompanying drawings.

SUMMARY OF THE INVENTION

In accordance with the present invention, a lead-acid cell or battery is provided which has an expandable cover configuration that accommodates the inevitable grid growth in service, but which maintains the required cover-to-container and terminal-to-cover seals. This cover configuration utilizes an expandable area surrounding at least the positive terminal which includes a first region accommodating a terminal-cover sealing assembly and a second region about the first region and having a position outward from the interior of the cell relative to the location of the first region. As grid growth occurs in service, the first region, together with the terminal-cover sealing assembly, move outwardly toward the outward position of the second region. In this fashion, the grid growth which occurs in service is accommodated without adversely affecting the reliability of either the terminal-cover or cover-container seals.

The terminal-cover sealing assembly comprises outer- and inner-cell sealing members cooperating to retain the first region of the expandable cover area therebetween. A flange surrounding the terminal opening in the cover is held in place by the cell-sealing members; and resilient seals, such as, for example, O-rings, provide the requisite terminal cover seal.

In one embodiment, the terminal-cover sealing assembly utilizes a seal nut as the outer-cell sealing member and a plastics member molded about the terminal post as the inner-cell sealing member. Another preferred embodiment includes the seal nut cooperating with an annular member formed about the terminal post as the inner-cell sealing member.

With either embodiment, manufacture and assembly can be reliably and efficiently carried out. As should be appreciated, this invention is susceptible to various modifications and alternative forms. However, it is not intended to limit the invention to the particular form disclosed, but, on the contrary, the invention is to cover all modifications, equivalents and alternatives falling within the spirit and scope of the invention as expressed in the appended claims. Thus, while the invention will be illustrated with sealed lead-acid cells and batteries, it should be appreciated that this invention is equally applicable to use with any cells or batteries wherein similar problems resulting from grid growth or the like occur and must be accommodated.

DETAILED DESCRIPTION OF THE INVENTION

Figure 1:
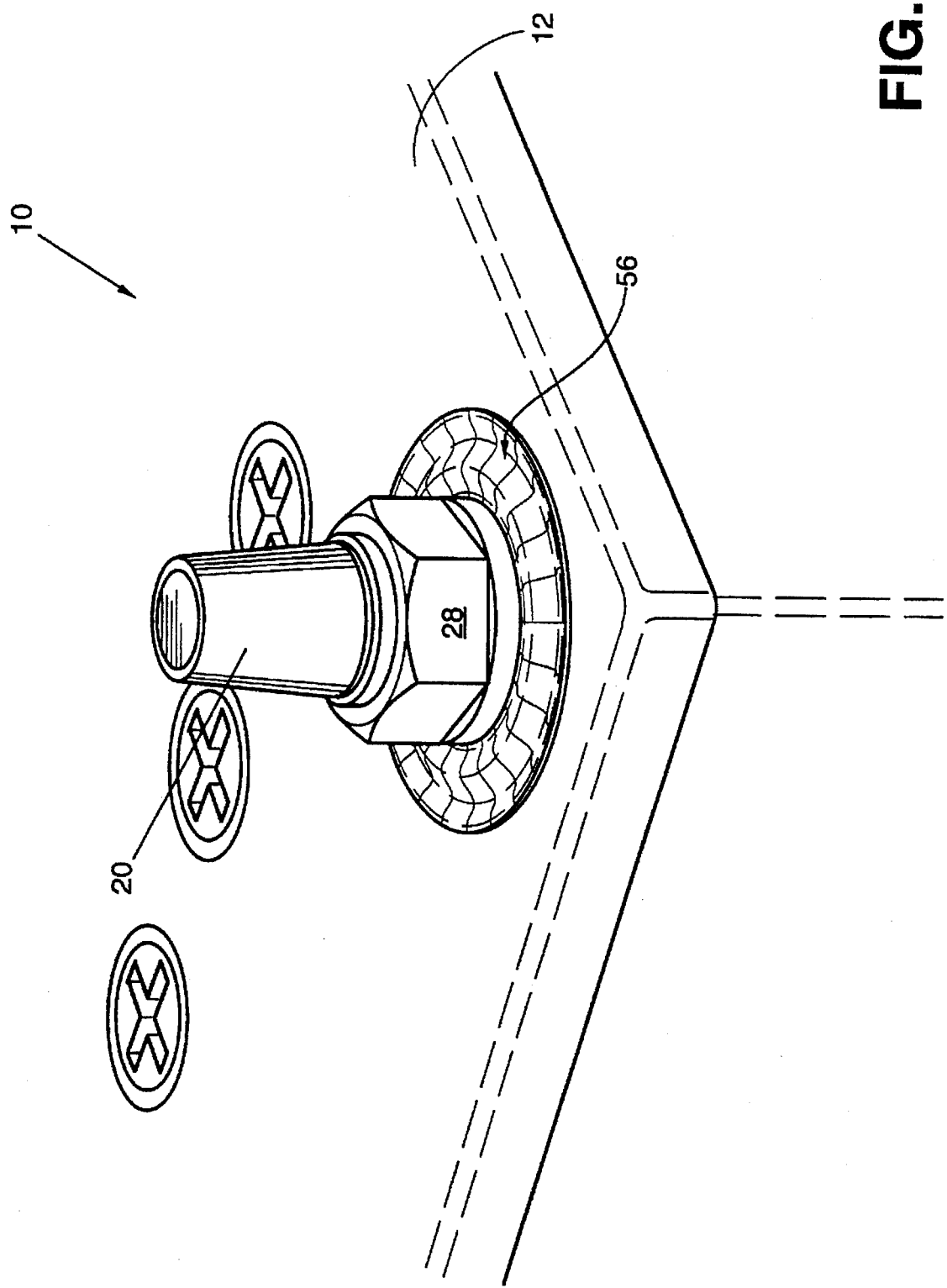
FIG. 1 is a partial perspective view of a sealed lead-acid cell/battery of the present invention.

FIG. 1 illustrates the sealed lead-acid cell/battery 10 of the present invention having an expandable cover 12. The particular configuration of the cell or battery does not form a part of the present invention. Many configurations are known and may be used. Similarly, the specific components that are used in the cell or battery, other than the components associated with the expandable cover as will be described herein do not form a part of this invention. Any desirable components that fit the requirements for the intended application may be utilized, a wide variety of components having been used and are known. U.S. Pat. No. 4,401,730 to Szymborski et al. discloses an illustrative example of a suitable sealed lead-acid cell.

Figure 2:
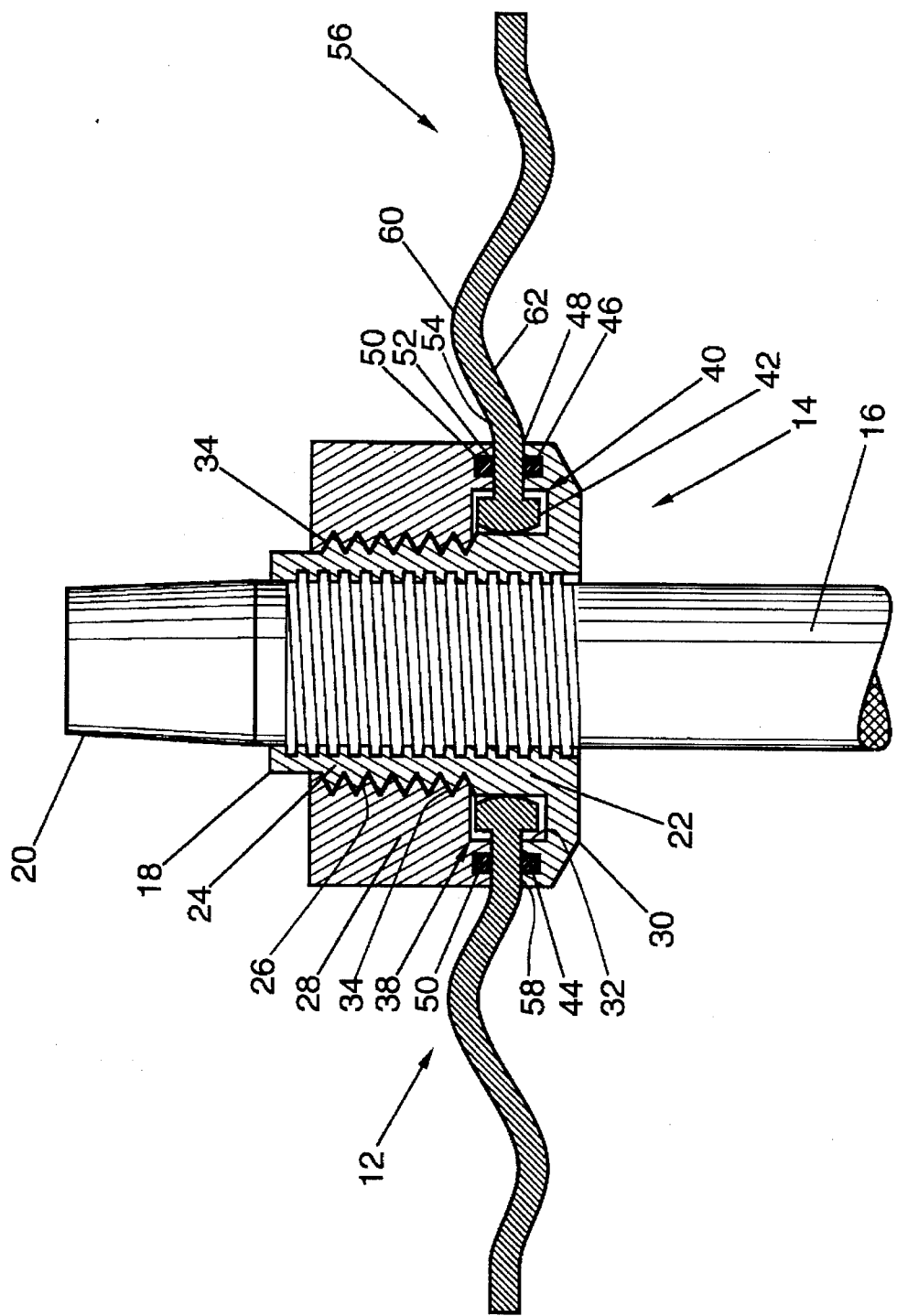
FIG. 2 is an enlarged, partial cross-sectional view of the cell/battery shown in FIG. 1, taken generally along line 2—2 in FIG. 1, illustrating one preferred cover and seal configuration.

Pursuant to the present invention, FIGS. 1 and 2 illustrate a sealed lead-acid cell/battery having one preferred embodiment of an expandable cover according to the present invention. Thus, the cover 12 has a terminal opening 14 though which terminal post 16 protrudes. Preferably, and as is shown, the terminal post 16 has a series of rings 18 disposed and configured to provide a long tortuous path for electrolyte to migrate before any leakage could occur. The terminal end 20 of terminal post 16 extends a sufficient level above the cover 12 so as to allow adequate space for easy access for making the necessary electrical connection, but also to accommodate the above-cover member of the sealing assembly used.

In this embodiment, the terminal-cover sealing assembly includes a plastics member 22 which may be molded about terminal post 16, filling the space between rings 18. The above-cover annular part 24 of plastics member 22 has screw threads 26 for accepting a seal nut 28 that comprises the outer-cell sealing member of the terminal-cover sealing assembly. The bottom part of plastics member 22 terminates below the cover 12 and has an annular cantilever arm 30, having a groove 32 exposed to the cover opening 14. Cantilever arm 30 terminates at a location past the cover opening 14 so as to facilitate the terminal-cover sealing, as will be discussed hereinafter. The cantilever arm 30 in this embodiment comprises the inner-cell sealing member of the terminal-cover sealing assembly.

The material for the plastics member 22 can be any one useful for lead-acid cells. As an illustrative example, ethylene-polypropylene copolymers may be employed.

Seal nut 28 is threaded, as indicated at 34, complementally configured with threads 26 of the plastics member 22. Also, seal nut 28 includes a groove 38, dimensioned and positioned to form an annulus 40 with groove 32 of plastics member 22 about the terminal post 16.

The cover 12 includes a flange 42 which defines the cell opening 14, the flange being dimensioned so as to be positioned in annulus 40. The dimensions of flange 42 relative to annulus 40 should preferably be such that the flange 42 can be compressed and distended as seal nut 28 is screwed into its assembled position. It is thus preferred to have the flange 42 dimensions be slightly smaller than that of annulus 40. This arrangement retains the terminal, the cover and the sealing assembly in their desired relative location as grid growth occurs and the cover expands to accommodate the grid growth.

In accordance with a preferred aspect of the present invention, terminal-cover sealing is provided by a resilient seal or seals. The principal terminal-cover sealing is provided by a resilient seal located adjacent the inner surface of the cover. As shown in FIG. 2, first O-ring 44 is positioned in the plastics member 22 in seat 46 located in abutting contact with interior surface 48 of the cover 12. Second, O-ring 50, seated in seal nut O-ring seat 52, is positioned adjacent the outer surface 54 of cover 12. When seal nut 28 is in its assembled position, O-ring 50 provides desirable supplemental terminal-cover sealing.

Most preferably, both the principal and supplemental seals are utilized. It is likewise most preferable to locate the outer and inner cover seals in alignment with each other, as may be appreciated. Any shape or configuration of seal may be used, and many suitable seals are known. As may be appreciated, a suitable O-ring must be acid-resistant and maintain the desired seal for the expected service life of the cell or battery.

In accordance with a further and important aspect of the present invention, the cover portion about the cell opening is molded to provide an expandable area capable of being outwardly distended without affecting the cover-container seal and wherein the cell opening is located in a region in which the outward distention, or movement of the cover portion, can occur without significant adverse effects upon the reliability of the terminal-cover sealing arrangement. To this end, and as is shown in FIGS. 1 and 2, expandable area 56 has a first region 58 which accommodates terminal-cover sealing assembly and is preferably relatively flat to simplify the sealing function. About first region 58 is positioned second region 60 that is located outwardly (relative to the interior of the cell) therefrom. The relative outward differential is preferably at least equal to, and more preferably greater than, the expected grid growth expansion that will occur in the expected service life of the VRLA cell or battery. Of course, from the functional standpoint, all that is required is that the first region has the ability to flex outwardly enough during the desired service life without significant adverse effect upon the reliability of the terminal-cover and cover-container seals.

The movement resulting from grid growth can be described as being upward movement when the sealed cell is used in an upright position in service. When positioned on its side in service, the movement is, of course, outward relative to the interior of the sealed cell.

The illustrative embodiment shown in FIGS. 1 and 2 shows the expandable area portion 56, having a sinusoidal configuration when viewed in cross-section, as seen in FIG. 2. Any other configuration can be used which includes first and second regions that allow the terminal-cover sealing assembly to move as a unit as the expanded area is distended, or flexed, during service as grid growth occurs.

Figure 3:
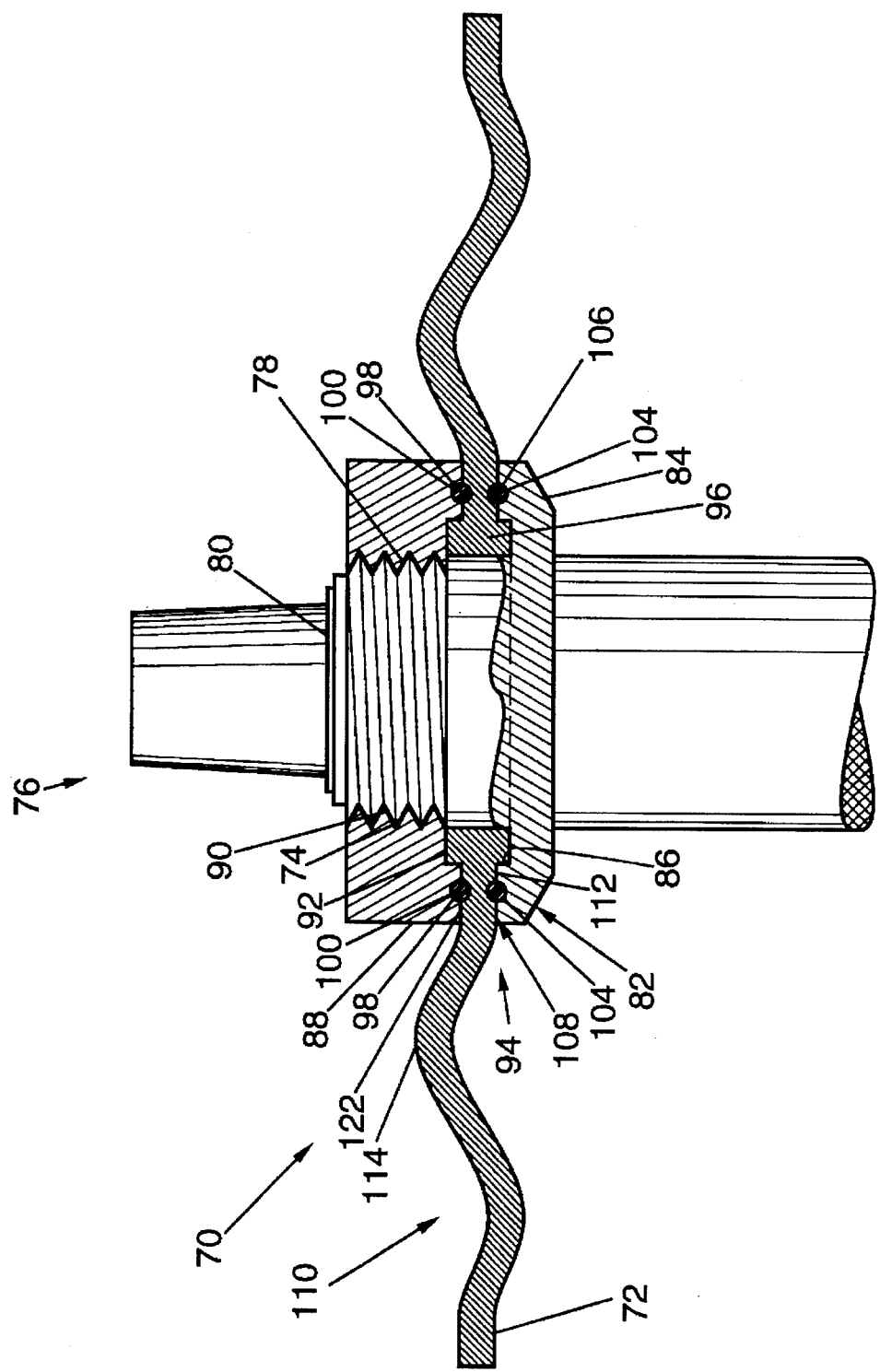
FIG. 3 is a partial cross-sectional view similar to FIG. 2 and showing another preferred embodiment at the cover and seal configuration.

FIG. 3 illustrates another preferred embodiment of the present invention. In this embodiment, the main components of the terminal-cover seal assembly shown in FIGS. 1 and 2 are identical, with one exception. In the FIG. 3 embodiment, the plastics member molded about the terminal post is eliminated, and the seal nut threads onto the terminal post and cooperates with a terminal annulus portion positioned adjacent the inner surface of the cover.

As is shown, the sealed lead-acid cell 70 includes an expandable cover 72. The cover 72 includes a terminal opening 74 through which terminal post 76 protrudes. The terminal post 76 is threaded, as indicated at 78, which provides a long tortuous path for electrolyte, thereby minimizing electrolyte leakage, as well as accommodating a sealing member as will be discussed hereinafter. The terminal end 80 of terminal post 76 extends a sufficient level above the cover 72 so as to allow adequate space for easy access for making the necessary electrical connections as well as, as in the other illustrative embodiments, accommodating the above-cover member of the sealing assembly utilized.

The sealing assembly includes an inner cell member 82 which has an annular cantilever arm 84 having a groove 86 exposed to the cover opening 74. Preferably, this interior sealing member can be cast integrally with the terminal post 76. Cantilever arm 84 terminates at a location past the cover opening 74, facilitating the terminal-cover sealing as described in conjunction with the initial embodiment. Seal nut 88 is threaded, as indicated at 90, so as to be threaded upon the terminal post 76. Seal nut 88 comprises the outer seal portion of the terminal-cover sealing assembly, cooperating with inner sealing member 82. As in the initial embodiment, seal nut 88 includes a groove 92 forming an annulus 94 with groove 104 of the inner sealing member 82.

Also, the cover 72 includes a flange 96 which defines the annular extent of the cover opening 74, the flange being dimensioned and positioned as previously described. Similarly, terminal-cover sealing is provided by internal and, when used, external resilient seals. The inner seal member 82 likewise includes a seat 104 accommodating an O-ring 106, which O-ring is retained in an abutting relationship with the inner surface 108 of the cover 72. As shown, O-ring 98 seated in seal nut O-ring seat 100 is positioned adjacent the outer surface 102 of the cover 72 and provides, when used, desirable supplemental sealing.

Similarly, the cover 72 is formed with an expandable area 110 having a first region 112 and a second region 114. Distention or flexing of this cover portion, as grid growth occurs, can be accommodated without disturbing the desired sealing as previously described in the embodiment of FIG. 2.

In both illustrative embodiments, the expandable cover area completely surrounds the terminal post, and this configuration is preferred. However, if desired, extending the area less than 360° is certainly within the scope of the invention. In such a configuration, it would be preferable to provide symmetrical segments (e.g., four 60° arcuate segments equidistantly positioned about the terminal post) to allow essentially symmetrical outward movement of the terminal-cover sealing assembly as grid growth occurs.

Also, while not forming a part of the present invention, the terminal, seal nut or other component could be coated with a sealing composition to minimize electrolyte leakage. Many such sealing compositions are known.

Further, while the sealing achieved in the illustrative embodiments is provided by O-rings located outboard from the cover flange, other positioning could be used. For example, an O-ring washer or the like could be positioned in the annulus formed by the outer-and inner-cell sealing members. Such a configuration provides additional assurance that the flange is in a satisfactory sealing arrangement. Indeed, both configurations could be used together if desired.

The present invention thus provides a sealing assembly which not only effectively achieves the necessary terminal-cover sealing, but also does so in a fashion which accommodates the inevitable distention of the cover which occurs due to grid growth in service without disturbing either the terminal-cover or the cover-container seals. The sealing assembly components, including the cover for the sealed lead-acid cell/battery can be readily manufactured on an automated basis.

We claim:

1. A sealed lead-acid cell subject to grid growth during service comprising a container, a cover sealed to said container and having an inner and an outer surface and terminal openings, a positive and negative terminal extending above the height of the cover, an expandable cover area surrounding at least said terminal opening for said positive terminal, a first region accommodating a terminal-cover sealing assembly, and a second region located about said first region and having a position outward from the interior of the cell relative to the location of said first region, a terminal-cover sealing assembly comprising inner and outer-cell sealing members, said cover having a flange surrounding said terminal opening for at least said positive terminal, said inner and outer-cell sealing members each having a groove together forming an annulus about at least said positive terminal in which said flange is seated, said outer-cell sealing member being threaded onto said terminal and retaining at least part of said first region between said outer-cell sealing and said inner-cell sealing members, and at least one of said inner and outer-cell sealing members having a resilient sealing means positioned between the respective said member and the respective surface of the cover, said lead-acid cell accommodating grid growth in service by allowing said first region to move toward the position of said second region aspect during service.

2. The cell of claim 1 wherein said inner and outer-cell sealing members each have a resilient sealing member.

3. The cell of claim 2 wherein each of said resilient seals comprises an O-ring seated in a groove and positioned about the terminal with said flange being located between said O-rings and said terminals.

4. The cell of claim 3 wherein said outer-cell sealing member comprises a seal nut.

5. The cell of claim 4 wherein said inner-cell sealing member comprises an annular member cast with said terminal.

6. The cell of claim 1 wherein said expandable cover area is molded into said cover and, in cross-section, assumes a sinusoidal configuration in its assembled position prior to use in service.

7. The cell of claim 6 wherein the distance between said first and second regions is at least equal to the distance expected to be caused by the grid growth in service.

8. The cell of claim 2 wherein said outer-cell sealing member is threaded directly onto said terminal.

9. The cell of claim 2 wherein said terminal has a series of rings and includes a plastics member molded about said terminal, the molded plastics member filling the space between said rings and having a threaded outer surface, and said outer-cell sealing member being threaded about the outer threaded surface of said plastics member.

* * * * *